May 30, 1950  J. A. SIMPSON, JR  2,509,700
RADIOACTIVITY MEASURING DEVICE
Filed Feb. 21, 1947  4 Sheets-Sheet 1
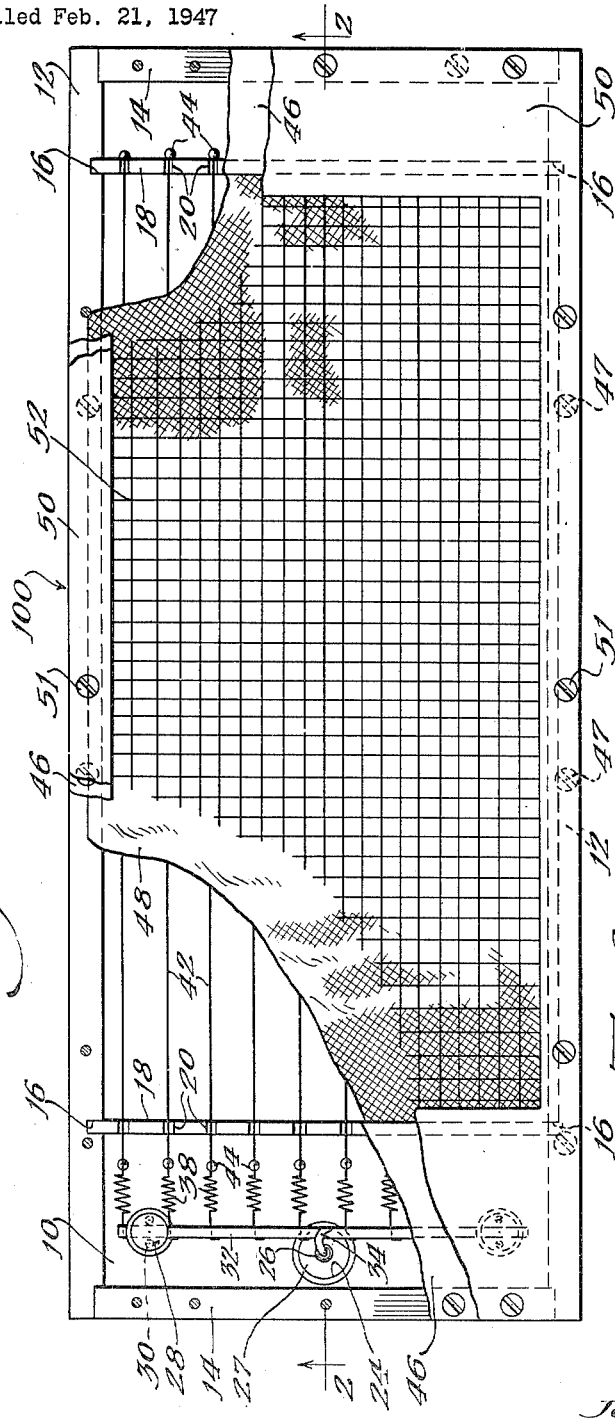
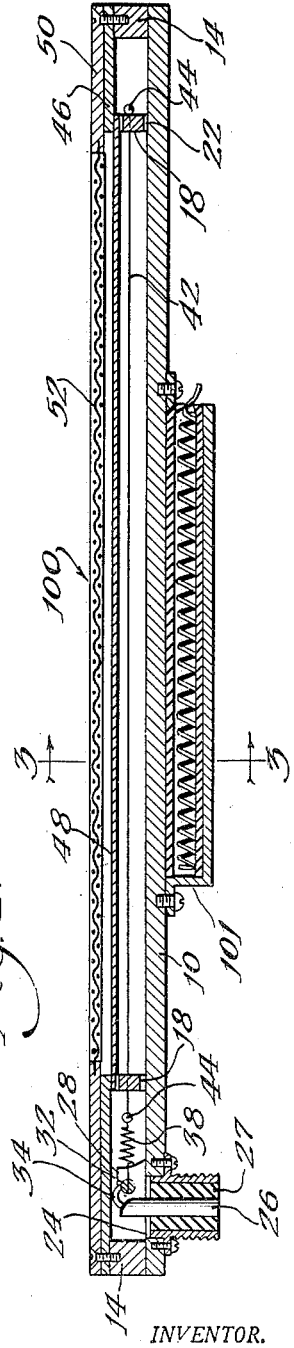
INVENTOR.
John A. Simpson, Jr.
BY
Roland A. Anderson
Attorney May 30, 1950 J. A. SIMPSON, JR 2,509,700
RADIOACTIVITY MEASURING DEVICE
Filed Feb. 21, 1947 4 Sheets-Sheet 2
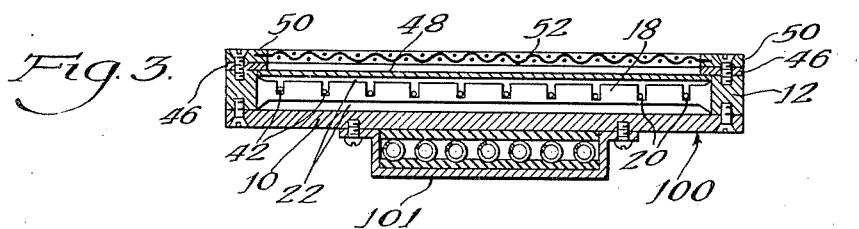
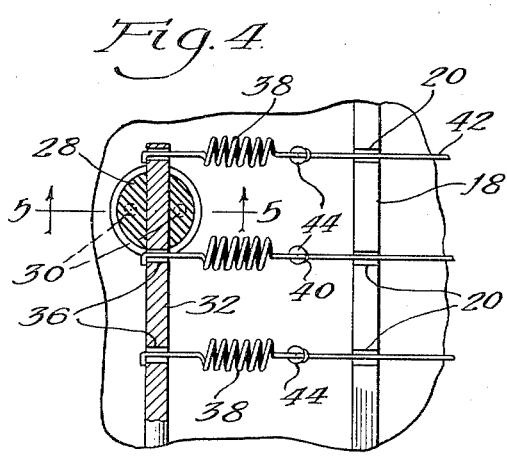 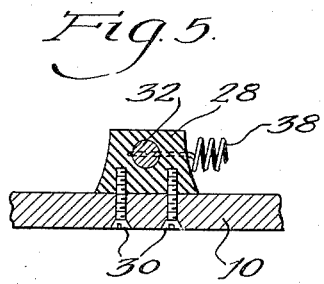
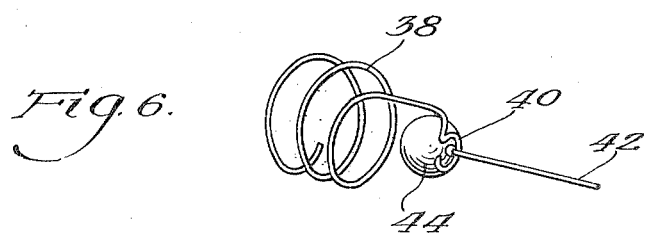
INVENTOR.
John A. Simpson, Jr.
BY
Roland A. Anderson
Attorney May 30, 1950  J. A. SIMPSON, JR  2,509,700
RADIOACTIVITY MEASURING DEVICE
Filed Feb. 21, 1947  4 Sheets-Sheet 3

INVENTOR.
John A. Simpson, Jr.
BY
Roland A. Anderson
Attorney.

May 30, 1950  J. A. SIMPSON, JR  2,509,700
RADIOACTIVITY MEASURING DEVICE
Filed Feb. 21, 1947  4 Sheets-Sheet 4

INVENTOR.
John A. Simpson, Jr.
BY
Robert A. Anderson
Attorney

Patented May 30, 1950

2,509,700

UNITED STATES PATENT OFFICE 2,509,700

RADIOACTIVITY MEASURING DEVICE

John A. Simpson, Jr., Chicago, Ill., assignor to the United States of America as represented by the United States Atomic Energy Commission Application February 21, 1947, Serial No. 730,174

13 Claims. (Cl. 250—83.6)

This invention relates to improved apparatus for the measurement of radioactivity. More specifically the invention pertains to a device for the measurement of radioactive contamination of portions of the human body such as the hand.

Workers in laboratories and plants dealing with radioactive materials are exposed to the hazard of having their bodies contaminated with dust and dirt containing particles of the material which they handle. Such contamination is particularly dangerous on the hands since, if the worker leaves the plant or laboratory with such materials on his hands, he is prone subsequently to ingest the materials along with food and to contaminate items outside the laboratory or plant, particularly in his home. One of the greatest hazards in this regard arises in handling materials such as plutonium which, although not particularly dangerous when external to the body, is very harmful when taken into the body in minute quantities. When plutonium is taken into the body it eventually concentrates in the bones. The alpha particles emitted by the plutonium then cause ionization in these sensitive regions. Thus, a small amount of plutonium received into the body may cause great damage.

It is therefore important that parts of the body, particularly the hands, of workers leaving a plant or laboratory handling plutonium, be surveyed for contamination by such material. As is well known the simplest method of measuring such contamination is by measurement of the radioactivity. But the measurement of alpha particle activity in such circumstances presents serious problems. Alpha particles have a very short path-length. It is therefore necessary that the measuring instrument be in close proximity to the hand under measurement.

The co-pending application of the present inventor, filed in the United States Patent Office on April 26, 1945, No. 590,424, describes a novel radiation counter that is responsive to radiations emanating through a substantially solid angle. The present application is a continuation-in-part to the extent that the former application is relevant.

It is desirable that the instrument used have the capacity to distinguish between alpha particles and other radioactive particles and emanations. Therefore, an ionization chamber is not a very satisfactory instrument for making such measurements, since an ionization chamber cannot make such a distinction between alpha particles and other types of radiations. The most satisfactory form of instrument for such measurements is the proportional counter. In the co-pending application of the present inventor, filed in the United States Patent Office on December 31, 1946, No. 719,525, there has been described a novel proportional counter adapted for the measurement and detection of alpha-particle-emitting contamination of such areas as floors, tables and portions of the human body.

It is the principal object of the present invention to provide a device incorporating such proportional counters, which device is adapted to measure the alpha-particle-emitting contamination of the human hand.

It is a further object of the invention to provide such a device which is capable of making such measurement on both the front and back surfaces of the human hand simultaneously.

It is a still further object of the device to provide a novel arrangement of radiation counters adapted to conform to the contours of the human hand.

For understanding of the invention, reference is made to the drawing in which:

Fig. 1 is a plan view of a proportional counter with covering screens to be described below partially broken away to show the internal construction;

Fig. 2 is a longitudinal cross sectional view taken along the line 2—2 of Fig. 1 in the direction indicated by arrows;

Fig. 3 is a transverse cross sectional view of the proportional counter taken along the line 3—3 of Fig. 2 in the direction indicated by the arrows;

Fig. 4 is an enlarged fragmentary cross sectional view of a portion of the counter illustrated in Fig. 1, showing certain details of the mounting of the center-wires thereof;

Fig. 5 is a fragmentary cross sectional view illustrating the mounting of an insulator shown in Fig. 4 taken along the line 5—5 of Fig. 4 in the direction indicated by arrows;

Fig. 6 is an enlarged perspective view illustrating the manner of suspension of the center-wires of the counter of Fig. 1;

Figure 7:
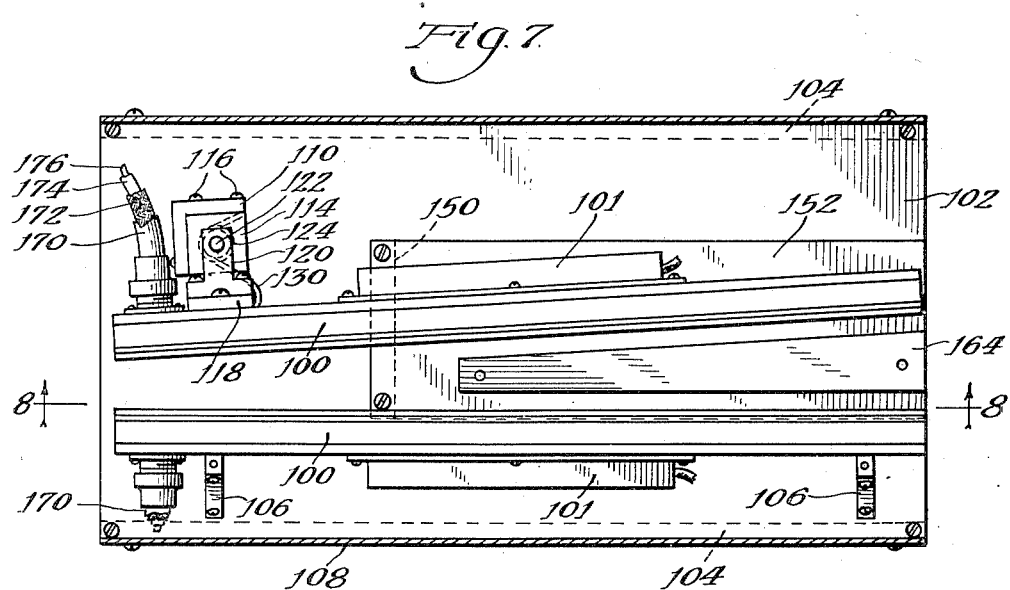
Fig. 7 is a plan view, partially in section, of a device for measuring alpha-particle-emitting contamination of the human hand.

Generally, the objects of the invention are accomplished by providing a novel mounting arrangement for two proportional counters, wherein both sides of a human hand may be surveyed for alpha-particle-emitting substances simultaneously and a timing device is actuated by insertion of a hand between the counters. Although the counters themselves are not the subject of present invention, their construction is illustrated in the drawing and described below in order to convey a full understanding of the invention.

Referring first to Figs. 1 and 2, a rectangular back plate 10 has mounted thereon as by screws at the outer perimeter thereof two side walls 12 and two end walls 14, for example of brass or aluminum, defining the body of the proportional counter. The interior dimensions may be, say, 5 inches by 12 inches by ⅜ inch. On the interior surface of each of the side walls 12 are two grooves 16 adapted to receive the ends of insulators 18. As appears more clearly in the transverse view of Fig. 3, each of the insulators 18 consists of a substantially rectangular bar of an insulating material, preferably polystyrene, extending across the counter from one side wall 12 to the other. Spaced along the upper edge of each of the insulators 18 are equally spaced transverse notches 20. As illustrated in Fig. 3, the insulators 18 are wider at the extreme ends thereof than at the central portion in which the notches 20 appear, thus leaving air gaps 22 between the insulator 18 and the back plate 10 and between the insulator 18 and the upper conducting surface hereinafter to be described.

Adjacent one end 14 of the plate 10 is an aperture 24 (Figs. 1 and 2) through which enters the center conductor 26 of a conventional coaxial cable connector 27 which is fastened to the back plate 10 by conventional means. Two insulating posts 28, preferably of polystyrene, are equally spaced from the coaxial cable connector 27 along a transverse line slightly forward of the connector 27. The insulating posts 28, as appears more clearly in Fig. 5, are fastened to the back plate 10 by screws 30 extending therethrough, the posts 28 being internally threaded for this purpose. The posts 28 have aligned transverse apertures therein adapted to receive in tight-fitting fashion a rod 32, for example of brass. The rod 32, for example ⅛ inch in diameter, is supported transversely of the counter by the insulating posts 28. A connecting wire 34 is soldered at one end to the center conductor 26 of the connector 27 and at the other end to the central portion of the rod 32. Extending transversely of the rod 32, and thus longitudinally of the counter, are small apertures 36 in the rod 32, as is more clearly shown in Fig. 4.

Threaded through each of the apertures 36 is the end of a coiled spring 38. The end of each of the coiled springs 38 is prevented from coming out of the aperture 36 by a right-angle bend at the end of the spring. The other ends of the springs 38, as more clearly shown in Fig. 6, are bent into the form of small hooks 40 which support the center-wires 42 of the counter. The center-wires 42 are preferably of 1 mil tungsten wire. At each end of the wire 42 is a small conducting ball 44, preferably spherical, for example of silver solder, substantially integral with the wire 42. The ball 44 at one end of the wire 42 is retained in place by the hook 40 which is smaller in diameter than the ball 44 but greater in diameter than the wire 42. The spring 38 exerts tension on the wire 42. Each wire 42 traverses the corresponding notch 20 in the first insulator 18 and extends to the other end of the counter, where the other end of the wire 42 is held in place by the other spherical ball 44 which is larger in diameter than the width of the notch 20 in the second insulator 18, so that the tension in the spring 38 holds the ball tightly against the notch 20, and thus secures the center-wire in place. It will be seen that the center-wires 42 may be readily replaced without the necessity of soldering.

Over the face of the counter, supported by the walls 12 and 14 of the counter, is a rectangular frame 46 constituting the support for a window 48, which is secured, as by cement, to the edge thereof. The window 48 may be of nylon of less than 0.5 mil thickness, and preferably of 0.2 mil thickness. The window 48 extends over approximately all the face of the counter corresponding to the region between insulators 18 near either end thereof. The window 48 has deposited upon the inner surface thereof a thin coating of a conducting substance such as graphite (not visible in the drawing). Superimposed upon the frame 46 for the window 48 is an additional frame 50, preferably of a plastic such as polymerized methyl methacrylate, commonly called "Lucite." The frame 50 constitutes the support for a wire mesh screen 52, preferably of stainless steel, which extends thereacross and the edges of which are preferably molded into the frame 50. The frames 46 and 50 are secured to the walls 12 and 14 by screws 47 and 51, respectively.

In the construction of the counters described in Figures 1 to 6, the joints are preferably air permeable, for it will be readily seen that otherwise a pressure differential could build up across the delicate window 48. It is not necessary, however, to provide an aperture to allow an influx of air, because sufficient air will leak through the joints of the counter body to equalize the pressure on opposite sides of the window 48.

Fastened to the back plate 10 is a conventional heater 101. The heater 101 serves a very important function in measuring the contamination of surfaces such as the human hand. As is well known, the presence of moisture to a high degree in the ionization medium of a proportional counter impairs the efficiency of the insulators therein employed, and is prone to cause spurious electrical pulses which simulate the pulses caused by the particles under measurement. The human hand normally perspires to a degree varying among various individuals. It has been found that precautions must be taken to insure that the measurement is not impaired by the effect of moisture, since the operation of the counter is such that the hand is pressed against the counter and there is a certain amount of moisture transmission into the ionizing medium of the counter. The heater 101 serves to heat the ionizing medium and the counter parts so as to prevent condensation of moisture on insulators. In addition, the relative humidity of the air within the counter is made lower than that of the ambient air because of the increased temperature. Such a heater is of great advantage not only in the particular application herein described but also in any application in which the relative humidity of the air, which constitutes the ionizing medium of the counter illustrated, is prone to become high.

The window 48 constitutes, with the back plate 10, a parallel-plate cathode, the anode center-wires 42 preferably being approximately midway therebetween. The window 48 permits alpha particles from the exterior to enter the counter. The screen 52 protects the window 48 against both protrusions and dirt accumulations on surfaces, and may readily be removed for cleaning, for example in an acid bath if made of acid-resistant material such as the resin suggested above.

Except for the novel provision of the heater 101, the counter described above, designated generally by the number 100 in the drawing, is not in itself the subject of the present invention, being fully described both in construction and in theory in the co-pending application mentioned above.

Figure 8:
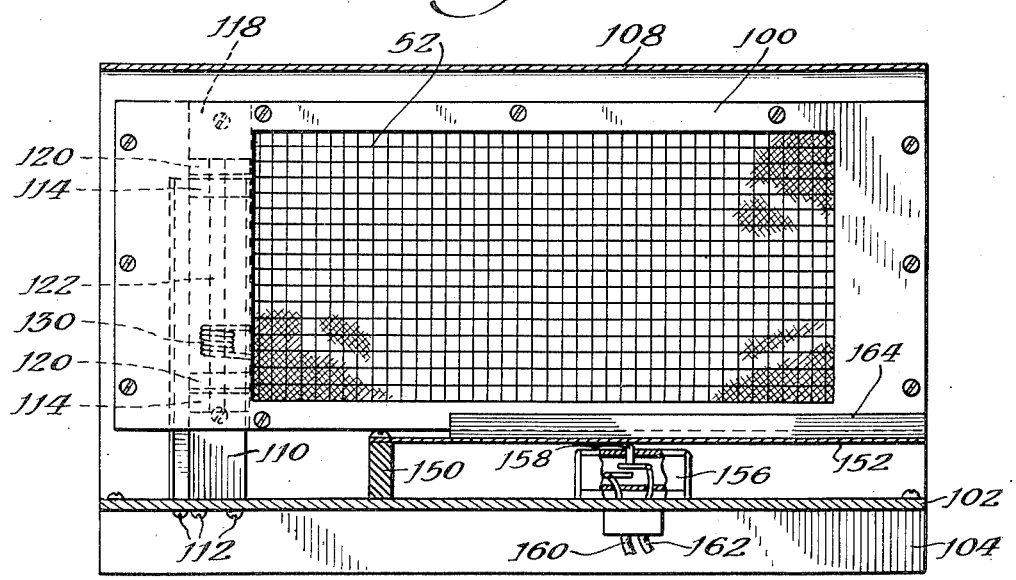
Fig. 8 is a vertical cross sectional view taken along the line 8—8 of Fig. 7 in the direction indicated by arrows.
Figure 9:
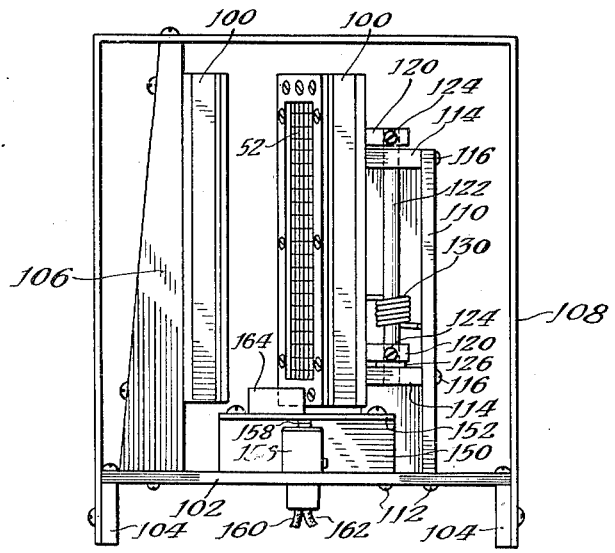
Fig. 9 is a front elevation of the device illustrated in Figs. 7 and 8.

In Figs. 7, 8, and 9 there is illustrated a device embodying the present invention, for measuring the alpha-particles-emitting contamination of the human hand incorporating two of the proportional counters 100 described above. A base plate 102 is supported at the edges thereof by supports 104. One of the counters 100 is supported in a vertical plane by supporting posts 106, which are screwed to the back thereof and which are maintained in position by screws which secure the posts 106 to the base plate 102 and to a cover 108 which surrounds the top and sides of the device.

An L-bracket 110 is mounted by screws 112 vertically on the base plate 102 toward the side opposite the fixed counter 100 whose mounting is described above. Within the angle of the L-bracket 110 are rectangular blocks 114 oriented horizontally and spaced vertically along the bracket 110 and secured thereto by screws 116. To the back of a second counter 100 is screwed a transverse strap 118 to which is fastened by screws two vertically spaced horizontal tabs 120. The blocks 114 and the tabs 120 have aligned apertures through which extends a cylindrical pivot rod 122. The pivot rod 122 is maintained stationary with respect to the tabs 120 by set screws 124, but is free to rotate in the apertures in the blocks 114. Preferably the blocks 114 contain bearings such as roller bearings (not illustrated) in order to withstand the wear of repeated pivoting of the counter 100. For the same purpose, a washer 126 is inserted between the lower tab 120 and block 114 to absorb the friction between the lower surface of the former and the upper surface of the latter. All of the parts described above may be of brass for example, except the pivot rod 122 which is preferably of steel.

A spring 130, for example of music wire, is coiled around the rod 122 and has one end pressed against the back of the pivoted counter 100 and the other end pressed against the bracket 110 so as to tend to maintain the counters 100 substantially parallel when there is no force on the movable counter 100 other than that of the spring 130.

When a hand is inserted at the front of the device between the two counters 100, the heel of the hand so inserted spreads the front edges of the counters and thus brings the back edges closer together because of the pivotal mounting of one of the counters 100, as above described. The hand may be inserted as far as it is comfortable to do so and the angle between the two counters 100 will automatically adjust itself to the size and contour of the individual hand inserted. In this way, the screens 52 of the counters 100 will be against the front and back of almost any normal-sized hand so inserted. Variations not only in the sizes of inserted hands but also in relative thickness of the heel of the hand and fingers are thus automatically compensated so that the counting efficiency of the counters for emitted alpha-particles is relatively independent of the contours of the particular hand. This feature renders the device highly useful in applications where the hands of hundreds of people must be surveyed daily, as is common in plants and laboratories handling such materials.

Rearward of the base plate 102 is mounted a substantially rectangular support plate 150 to which is fastened the rear edge of a flexible plate 152 of, for example, aluminum which extends to the front of the device beneath the bottom edges of the counters 100. Beneath the plate 152 is mounted a pressure-responsive switch 156 having a vertical plunger 158 adapted to be actuated by depression of the flexible plate 152. As shown schematically in Fig. 8, actuation of the plunger 158 closes a circuit between external leads 160 and 162 which are connected to the terminals of the switch 156. It will be understood that the switch 156 may be any conventional pressure-actuated switch, preferably of a sensitive type.

Mounted upon the flexible plate 152 is a longitudinally tapered block 164 which extends above the plane of the bottom edges of the counters 100 into the space therebetween. The block 164 serves as a rest for a hand inserted into the device, and upon insertion of a hand actuates the plunger 158 so as to close the circuit between the leads 160 and 162 for a purpose to be described below. In addition, the block 164 serves as a stop to fix the position of the movable counter 100 when there is no hand in the device so that the front edge of the gap between the counters 100 will not be closed by the force exerted by the spring 130. Conventional coaxial cables 170 comprising grounded shields 172, insulating dielectrics 174 and center-conductors 176 are connected to the counters 100, the center-conductors 176 being connected to the center wires of the counters.

Figure 10:
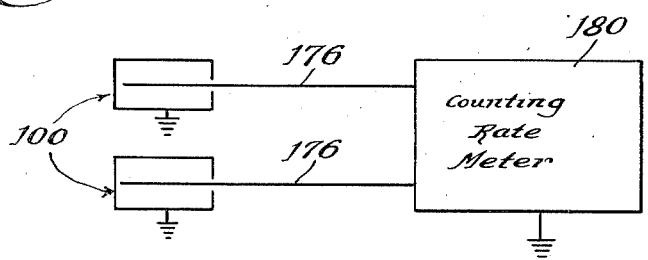
Fig. 10 is a schematic block diagram of an electrical circuit associated with the proportional counters which constitute a portion of the device for measuring contamination.
Figure 11:
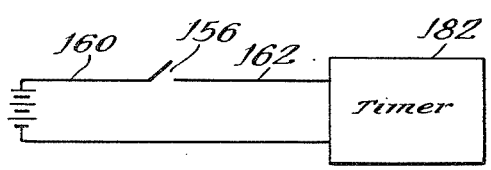
Fig. 11 is a schematic block diagram of the electrical circuit associated with a switch which constitutes a portion of the device for measuring contamination.

In Fig. 10 is illustrated schematically the electrical connections of the counters 100. Each of the center-conductors 176 is connected to an input of a counting-rate meter 180. As is well known, the counting-rate meter gives an indication of the average counting rate of the counters 100. As is well known in the art, a counting-rate meter must flatten out the statistical fluctuations which are inherent in the emission of particles by radioactive bodies. Accompanying such flattened-out statistical fluctuations is a response time which is required for such an instrument to reach equilibrium when the counters, whose counting-rate is under measurement, are exposed to any given intensity of radiation. Therefore, when a hand is inserted between the counters 100, the counting-rate meter 180 does not instantly give an indication of the average counting rate. In order to obtain such a reading, it is necessary that the hand be allowed to remain between the counters 100 until the meter 180 has reached equilibrium. In the past the reaching of equilibrium in using a counting-rate meter has commonly been assured by allowing the counter whose counting-rate is being measured to be exposed to the radioactivity under measurement for a time which is long with respect to the time of reaching equilibrium, or by measuring the time of exposure by such means as a clock or stopwatch. In Fig. 11 there is shown schematically an electrical circuit including the switch 156 of the present device, which obviates such a requirement of measuring the time and adapts the device to routine surveying of the hands of large numbers of persons without the presence of an operator for the device. When a hand is inserted between the counters 100, the switch 156 is closed, thus automatically actuating a timer 182, which gives a visual or audible signal at the expiration of a preset time, which time corresponds to the time in which the counting-rate meter 180 is known to reach equilibrium. In this manner, any person may insert his hand into the device and will be automatically notified when to read the indication of the meter 180 and thus receive an accurate indication of the amount of alpha-particle-emitting contamination on his hand. Preferably, the counting-rate meter 180 of Fig. 10 includes a visual or audible alarm to indicate the presence of an amount of radioactive material greater than a predetermined tolerance value.

The design of counting rate meters 180 and timers 182 is well known and these elements are, therefore, illustrated in the drawing merely in block form, these elements in themselves not constituting an invention for which a patent is herein sought.

It will be understood that the teachings of this invention are not limited to the exact embodiment illustrated in the drawings and described above. The teachings of the invention may be used without the particular counters illustrated. Furthermore, the teachings may be employed to devise apparatus for measuring contamination of the human hand other than by alpha-particle-emitting substances. Likewise the novel system for automatic indication of the reaching of equilibrium by the counting-rate meter may be employed in other applications. Therefore the scope of the invention shall not be deemed to be limited by the description above and the illustrative embodiment of the drawings, but should be determined by the appended claims.

What is claimed is:

1. Apparatus for the measurement of radioactive contamination on the human hand comprising, in combination, two radiation counters and means for mounting said counters substantially parallel and facing each other at a distance approximating the thickness of a human hand, said mounting means including a pivotal support for at least one of said counters, so that the space between said counters substantially assumes the contour of a hand therein inserted.

2. Apparatus for the measurement of alpha-particle-emitting contamination on the human hand comprising, in combination, two proportional counters, and means for mounting said counters substantially parallel and facing each other at a distance approximating the thickness of a human hand, said mounting means including a pivotal support for at least one of said counters, so that the space between said counters substantially assumes the contour of a hand therein inserted.

3. Apparatus for the measurement of alpha-particle-emitting contamination on the human hand comprising, in combination, two proportional counters, and means for mounting said counters substantially parallel and facing each other at a distance approximating the thickness of a human hand, said mounting means including a pivotal support for at least one of said counters, so that the space between said counters substantially assumes the contour of a hand therein inserted, said proportional counters having an ionizing medium comprising air at atmospheric pressure.

4. Apparatus for the measurement of alpha-particle-emitting contamination on the human hand comprising, in combination, two proportional counters, and means for mounting said counters substantially parallel and facing each other at a distance approximating the thickness of a human hand, said mounting means including a pivotal support for at least one of said counters, so that the space between said counters substantially assumes the contour of a hand therein inserted, and heating means adapted to maintain the temperature of the ionizing medium above the ambient temperature.

5. Apparatus for the measurement of radioactivity comprising, in combination, a radiation counter adapted to produce electrical pulses proportional in number to the radioactivity of a body placed adjacent thereto, a counting-rate meter coupled to said counter and adapted to produce an indication of the counting-rate of said counter, said counting-rate meter having a time for reaching equilibrium after the placing of a body adjacent said counter, timing means, actuating means adjacent said counter and coupled to the timing means and adapted to be energized by the placing of a body adjacent to the counter.

6. Apparatus for the measurement of radioactivity comprising, in combination, a radiation counter adapted to produce electrical pulses proportional in number to the radioactivity of a body placed adjacent thereto, a counting-rate meter coupled to said counter and adapted to produce an indication of the counting-rate of said counter, said counting-rate meter having a time for reaching equilibrium after the placing of a body adjacent said counter, a pressure-responsive switch adjacent the counter and timing means coupled to the switch, said pressure-responsive switch being adapted to actuate said timing means upon the placing of a body against said switch.

7. Apparatus for the measurement of radioactive contamination of a human hand comprising, in combination two radiation counters, means for mounting said counters in substantially parallel planes and facing each other at a distance approximating the thickness of a human hand, a counting-rate meter adapted to produce an indication of the counting-rate of said counters, said counting-rate meter having a time for reaching equilibrium after a contaminated hand is placed between said counters, timing means, and actuating means adjacent to the counters and coupled to the timing means and adapted to be energized by the placing of a hand adjacent to the counters.

8. The apparatus of claim 7 wherein said counters are mounted in substantially vertical planes and said means responsive to the placing of a hand between said counters comprises, in combination, an electrical switch having a pressure-responsive member to the motion of which said switch is responsive, support means adapted to support the weight of a hand inserted into the space between said counters, at least a portion of said support means being adapted to move downward in response to the weight of a hand, and means for transmitting the motion of said portion of the support means to said pressure-responsive member, so that said switch is actuated by the placing of a hand between said counters.

9. Apparatus for the measurement of radioactivity comprising, in combination, measuring means adapted to measure the radioactivity of a body placed adjacent thereto, timing means adapted to measure elapsed time after actuation thereof, and actuating means adjacent the measuring means and coupled to the timing means and adapted to be energized by a body placed adjacent to the measuring means.

10. In apparatus for the measurement of radioactivity, in combination, means for measuring ionization having a plurality of electrodes an ionizing medium consisting of air at atmospheric pressure in communication with the air of the ambient atmosphere, and an enclosure surrounding the electrodes having at least a portion permeable to alpha particles and impermeable to dust, and heating means operatively coupled thereto and adapted to maintain the temperature of the ionizing medium above the ambient temperature.

11. In apparatus for the measurement of radioactivity, in combination, a proportional counter having an ionizing medium consisting of air at atmospheric pressure in communication with the air of the ambient atmosphere, and a window permeable to alpha particles and impermeable to dust, and heating means operatively coupled thereto and adapted to maintain the temperature of the ionizing medium above the ambient temperature.

12. In apparatus for the measurement of radioactivity, in combination, means for measuring ionization having a plurality of electrodes mutually insulated by insulators an ionizing medium consisting of air at atmospheric pressure in communication with the air of the ambient atmosphere, and a window permeable to alpha particles and impermeable to dust, and heating means operatively coupled thereto and adapted to maintain the temperature of the ionizing medium and the insulators above the ambient temperature.

13. Apparatus for the measurement of radioactivity comprising, in combination, a plurality of radiation counters and means for mounting at least two of said counters substantially parallel and facing each other, said mounting means including a pivotal support for at least one of said counters, so that the space between said counters substantially assumes the contour of a tapered body therein inserted.

JOHN A. SIMPSON, Jr.

REFERENCES CITED

The following references are of record in the file of this patent:

UNITED STATES PATENTS

| Number | Name | Date |
| --- | --- | --- |
| 2,104,378 | Pychlau | Jan. 4, 1938 |
| 2,167,630 | Bazzoni et al. | Aug. 1, 1939 |
| 2,219,273 | Scherbatskoy | Oct. 22, 1940 |
| 2,433,554 | Herzog | Dec. 30, 1947 |
| 2,472,365 | Borkowski | June 7, 1949 |

OTHER REFERENCES

Korff-Electron and Nuclear Counters, D. Van Nostrand, April 1946.

Simpson, Review of Scientific Instruments, vol. 15, No. 5, May 1944.

Brown et al., Review of Scientific Instruments, vol. 16, No. 5, May 1945.